March 13, 1945.  W. S. KALS  2,371,524
OPERATING DEVICE FOR CAMERAS
Filed Nov. 3, 1943  3 Sheets-Sheet 1
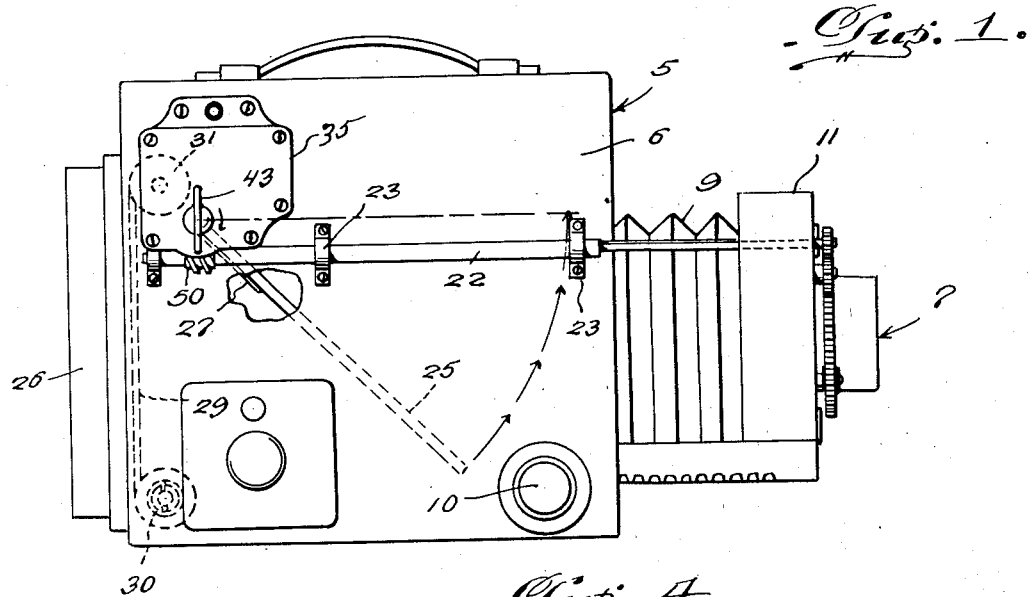
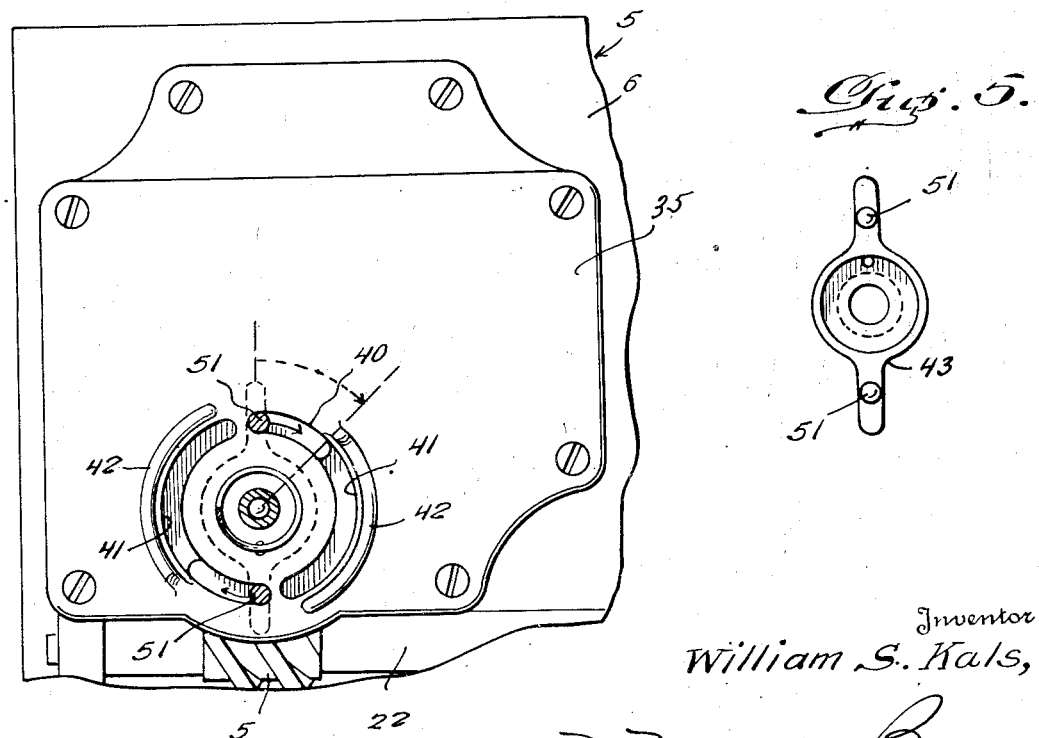
Inventor
William S. Kals,
By McMorrow and Berman
Attorneys March 13, 1945.  W. S. KALS  2,371,524
OPERATING DEVICE FOR CAMERAS
Filed Nov. 3, 1943　　3 Sheets-Sheet 2
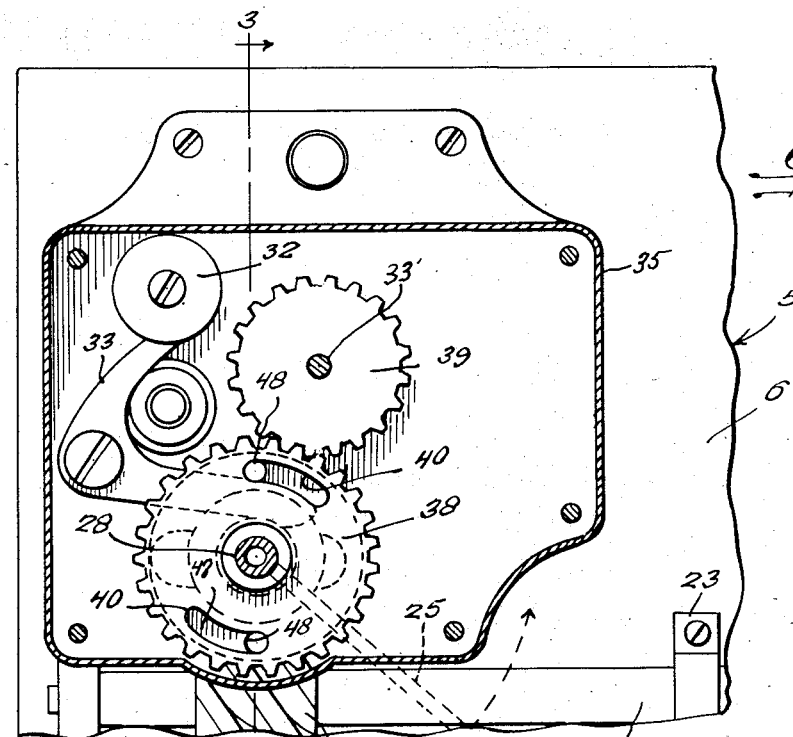
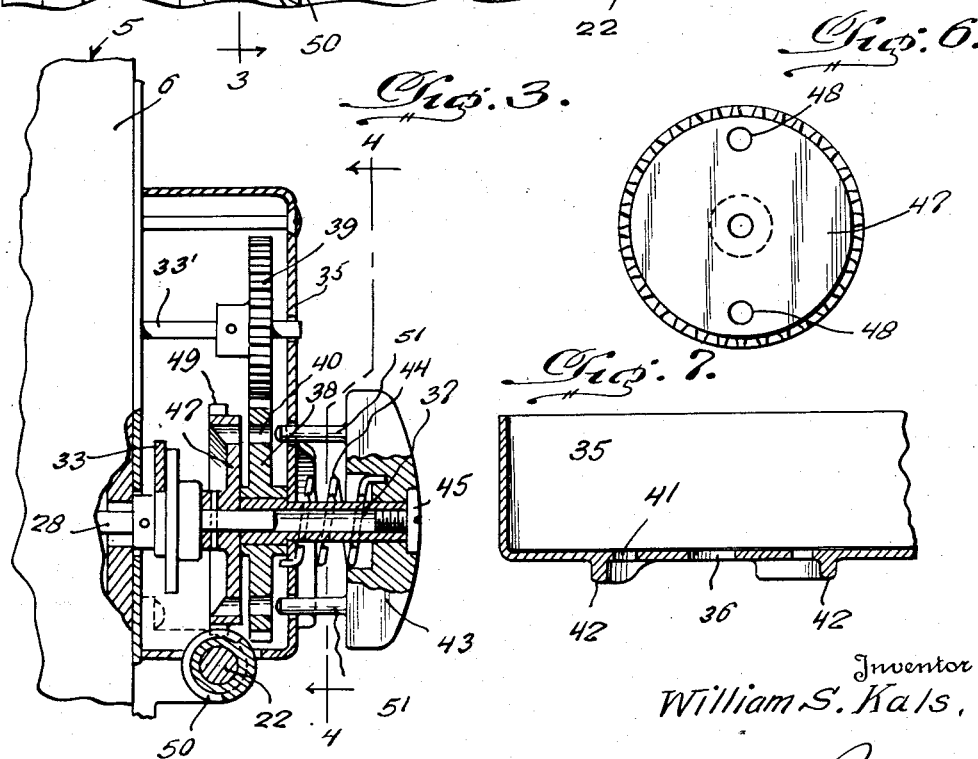
Inventor
William S. Kals,
By McMorrow and Berman
Attorneys

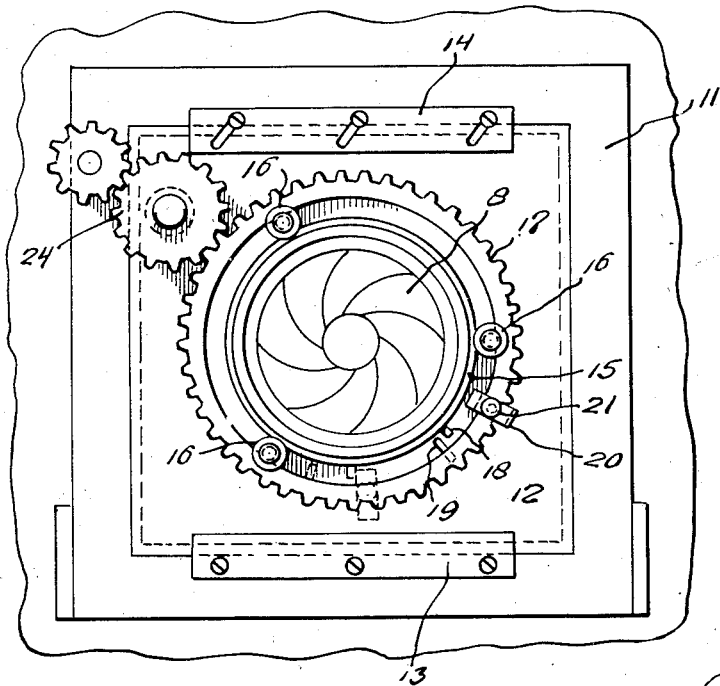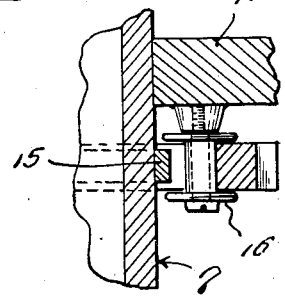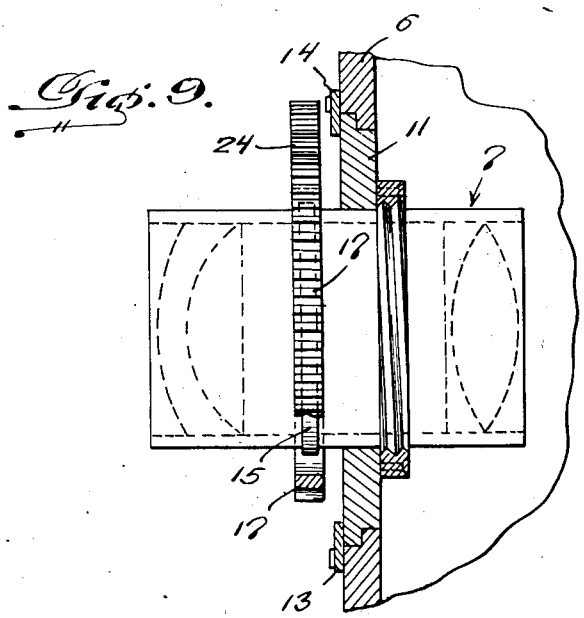

Patented Mar. 13, 1945

2,371,524

UNITED STATES PATENT OFFICE 2,371,524

OPERATING DEVICE FOR CAMERAS

William S. Kals, Vancouver, British Columbia, Canada, assignor to The Folmer Graflex Corporation, Rochester, N. Y., a corporation of Delaware Application November 3, 1943, Serial No. 508,845

6 Claims. (Cl. 95—42)

This invention relates to an operating device especially adapted for cameras of the reflecting type, frequently known in the art as a reflex or Graflex camera.

The primary object of the invention is the provision of a device which may be easily adapted to a camera of the character stated and will provide means for the mirror setting, rewinding of the curtain type shutter and the opening of the diaphragm of the lens mechanism of the camera after the exposure of the sensitized material in the taking of a picture, thereby arranging the camera for the focussing thereof in the taking of the next picture.

Another object of this invention is the provision of a device of the above stated character which may be manually operated through the actuation of a single finger knob or piece, consequently permitting the mirror to be set, the curtain type shutter rewound and the diaphragm of the lens mechanism open to its fullest extent quickly and with a minimum amount of effort on the part of the operator.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a camera equipped with a control device constructed in accordance with my invention.

Figure 2 is a fragmentary vertical sectional view through the casing of the control device, showing a portion of the present invention for establishing a driving connection between the mirror shaft, shutter rewind shaft and the diaphragm operating shaft.

Figure 3 is a sectional view taken on the line 3—3 of Figure 2.

Figure 4 is a sectional view taken on the line 4—4 of Figure 3.

Figure 5 is an end elevation illustrating the operating knob or finger piece.

Figure 6 is a side elevation illustrating one of the clutch discs carrying worm teeth.

Figure 7 is a fragmentary sectional view showing a part of the housing and the cam thereon.

Figure 8 is a fragmentary front elevation showing the diaphragm of the lens mechanism and the gearing between the diaphragm and the operating shaft.

Figure 9 is a fragmentary vertical sectional view of the lens mechanism including the diaphragm and illustrating the mounting thereof on the camera.

Figure 10 is a transverse sectional view of the diaphragm operating shaft.

Figure 11 is a fragmentary sectional view illustrating one of the rollers for the support of the main diaphragm gear.

Figure 12 is a fragmentary sectional view showing a stop mounted on the main diaphragm gear.

Referring in detail to the drawings, the numeral 5 indicates in entirety a conventional type of reflecting camera, wherein the camera box is designated by the character 6 and the lens mechanism by the character 7 and which includes the conventional type of diaphragm 8 used in controlling the amount of light through the lens to the interior of the box. The bellows between the lens mechanism 7 and the box is indicated by the character 9 and which permits the lens mechanism to be adjusted toward and from the box through the manual manipulation of a finger piece 10. Further the bellows 9 includes the usual boxing 11 for the support of the lens mechanism 7 and has a removably mounted panel 12 which carries the lens mechanism 7. The panel 12 is retained in place by plates 13 and 14 carried by the boxing 11. The plate 14 is mounted for a limited sliding movement so that the panel 12 can be easily removed and replaced when desired. The operating annulus of the diaphragm is indicated by the character 15, supported by rollers 16 journaled on the panel 12 which also supports the main operating gear 17 of the diaphragm. Pins 18 and 19 are secured to the annulus 15 and the gear 17 for the purpose of establishing a drive therebetween to bring about closing of the diaphragm. A stop 20 is adjustably secured on the gear 17 by a set screw 21 and may have a limited circumferential adjustment on said gear 17 and the purpose thereof is to establish a drive between the gear and the annulus 15 by engaging the pin 18 for the opening of the diaphragm to its fullest extent and may have its position adjusted on the gear and thereby decrease the amount of the opening of the diaphragm.

To bring about rotation of the gear 17 in opposite directions, a diaphragm operating shaft 22 telescopic in construction is journaled in bearings 23 mounted on the box 6 of the camera 5, and is connected to the diaphragm through a train of gears 24 one gear of which meshes with the main gear 17 of the diaphragm. The telescopic sections of the operating shaft 22 are keyed together whereby one section will rotate the other while said sections may have free sliding movement relative to each other.

The reflecting mirror is indicated in dotted lines by the character 25 and its operative position is as shown in Figure 1 for the purpose of reflecting the image from the lens mechanism to a groundglass (not shown) and which forms a part of the usual focussing device of the camera 5, also the mirror acts to close the light from the lens to the sensitized material located in the portion 26 of the box 6. In order that the sensitized material may be subjected to the light rays for the purpose of taking a picture after the focussing of the camera, the mirror 25 must be swung upwardly in the path indicated by the arrows in Figure 1 and this is accomplished through the use of an elevating spring 27. Normally the reflecting mirror 25 is releasably secured in its operative position and may be manually released through the actuation of a trigger mechanism (not shown). The mirror shaft which carries the mirror and permits its swinging movement both upwardly and downwardly is indicated by the character 28.

The curtain type shutter is indicated by the character 29 and is shown in dotted lines. Also shown in dotted lines are the rollers therefor and designated by the characters 30 and 31. The roller 30 in a camera of this kind is of the spring wound type for the purpose of winding thereon the shutter when the latter is free for the purpose of exposing the sensitized material. Normally the shutter is wound on the roller 31 in order that the shutter may block the sensitized material to light. Usually the winding of the shutter on the roller 31 is operated by a finger key and through a suitable mechanism (not shown) except for its control button designated by the character 32 engaged by a pivotally mounted lever 33. The shaft of the rewinding roller 31 is indicated by the character 33'.

Only such parts of a reflecting camera are shown in the drawings and briefly described in the foregoing description as will be necessary to give a clear understanding as to the application and operation of the present invention.

In adapting the invention to the camera, a housing 35 is substituted for the usual housing of the camera employed for enclosing the mechanism which operates the shutter and the mirror and has an opening through which the rewinding shaft 33' extends and also an opening 36 to slidably and rotatably receive a tubular shaft 37 fitted loosely over the end of the mirror shaft 28 and has secured thereon a clutch disc 38 provided with gear teeth on the periphery thereof which mesh with a gear 39 secured on the shutter winding shaft 33'. The clutch disc 38 is provided with arcuately curved slots 40 arranged opposite to each other. The housing 35 is also provided with slots 41 and cams 42. A knob or finger piece 43 is detachably secured to the tubular shaft 37 and a portion of the latter is surrounded by a coil type spring 44, one end of which is secured to the knob or finger piece and the other end secured to the housing. The purpose of the spring 44 is to rotate the finger piece or knob in one direction after being manually rotated in an opposite direction and released, also to urge the finger piece or knob to slide on the tubular shaft away from the housing. The sliding movement of the finger piece or knob under the influence of the spring 44 is limited by the securing means 45 employed in detachably securing the finger piece or knob on the tubular shaft. The inner end of the tubular shaft is piloted on the end of the mirror shaft and abuts a clutch disc 47 keyed or otherwise secured on the mirror shaft 28. The clutch disc 47 is provided with openings 48 arranged oppositely to each other and in alignment with the slots 40 of the clutch disc 38. Also the clutch disc 47 is provided with worm teeth 49 which mesh with a worm gear 50 secured on the diaphragm operating shaft 22.

The finger piece or knob 43 has integral therewith clutch pins 51 operating in the slots 41 of the housing. A movement of the finger piece or knob toward the housing against the action of the spring 44 will cause the pins to extend through the slots 40 of the clutch disc 38 and into the openings 48 of the clutch disc 47. The pins fitting in the openings 48 establish a drive between the finger piece or knob and the mirror shaft 28 for the purpose of rotating said shaft 28 in a direction to set the reflecting mirror in an operative position as shown in dotted lines in Figure 1. To bring about this movement of the reflecting mirror, it is to be understood that the knob or finger piece after its pins have entered the openings 48 is rotated in one direction. After the knob or finger piece has been rotated a certain distance and sufficient to bring the mirror into operative position for focussing the pins 51 engage ends of the slots 40 so that the clutch disc 38 will be rotated and on the further rotation of said finger piece or knob, brings about rotation of the shutter winding shaft 33 to wind the shutter on the roller 31 or to position the shutter so as to conceal the sensitized material. During the second described movement of the finger piece or knob the latter engages the cams 42 and withdraws the pins 51 from the openings of the clutch disc 47 so as to discontinue the driving action on the reflecting mirror after being set or during the time of the rewinding of the shutter on the roller 31. Therefore, it will be seen that the reflecting mirror is first moved into operative position for focussing prior to the rewinding of the shutter so that light rays will be kept from the sensitized material during the time the shutter is being rewound and thereby eliminate any possibility of the sensitized material being injured by light striking the same after having the picture taken by the camera.

On the completion of the rewinding of the shutter the finger piece or knob is released and the spring 44 disengages the pins 51 from the slots 40 and rotates said finger piece or knob in a reverse direction ready for the next cycle of operation of setting the reflecting mirror and the rewinding of the shutter. During the time that the clutch disc 47 is rotated by the rotation of the finger piece or knob 43, the shaft 22 is rotated to bring about opening of the diaphragm of the lens mechanism. Thus it will be seen that the camera is now ready to be focussed on an image for taking another picture, the rewinding of the shutter and the movement of the reflecting mirror into operative position and the opening of the diaphragm of the lens mechanism having been brought about through the operation of a single knob or finger piece.

By referring to Figure 4 it will be seen that the cams 42 are arcuately curved to follow the curvature of the slots 41 and are so arranged that after the finger piece or knob has been rotated sufficient to bring about movement of the reflecting mirror into operative position, the finger piece or knob will ride onto said cams and be forced outwardly from the housing a distance sufficient to withdraw the pins 51 from the openings 48 still permitting the pins to be in the slots 49 so that on further rotation of the finger piece the shutter will be rewound on the roller 31.

It is well known in the art that when taking the picture after the camera has been focussed, the diaphragm of the lens mechanism is closed down which brings about a reverse rotation of the operating shaft 22 repositioning or returning the clutch disc 47 to its initial position. When the shutter curtain is released in taking of the picture the clutch disc 38 is returned to its initial position by the reverse rotation of the winding shaft 33'.

Therefore, it will be seen that the present invention is constructed to efficiently operate with the parts now found in reflecting cameras and can be economically adapted thereto owing to the fact that the parts of the camera now used can be employed and need no alterations in the construction thereof in order that the present invention may be connected therewith.

While I have shown and described the preferred embodiment of my invention, it will be understood that minor changes in construction, combination and arrangement of parts may be made without departing from the spirit and scope of the invention as claimed.

Having thus described the invention what I claim is:

1. In combination with a reflecting camera including a reflecting mirror shaft and a shutter rewinding shaft and a diaphragm operating shaft, a finger knob, a tubular shaft rotatably and slidably mounted on the camera and having the knob rotatably and slidably mounted thereon, a pair of clutch discs one secured to said tubular shaft and the other secured to the mirror shaft, means connecting said clutch discs one to the shutter rewinding shaft and the other to the diaphragm operating shaft, one of said discs having openings and the other disc having slots, and pins carried by the knob to enter the slots and openings, the said slots being such that the said pins can move therein without turning the disk, and the said openings being such that the said pins, when in said openings, will turn the clutch disk, the said slots being positioned in the one disk in such relation with the openings in the other disk that the defined operation results, the said pins and openings being of such relative size that there is interaction between them in moving the disks, and the slots in the other disk being such that they allow some movement of the knob without turning said other disk, after which the disk is moved by the knob.

2. In combination with a reflecting camera including a reflecting mirror shaft and a shutter rewinding shaft and a diaphragm operating shaft, a finger knob, a tubular shaft rotatably and slidably mounted on the camera and having the knob rotatably and slidably mounted thereon, a pair of clutch discs one secured to said tubular shaft and the other secured to the mirror shaft, means connecting said clutch discs one to the shutter rewinding shaft and the other to the diaphragm operating shaft, one of said discs having openings and the other disc having slots, pins carried by the knob to enter the slots and openings, the said slots being such that the said pins can move therein without turning the disk, and the said openings being such that the said pins, when in said openings, will turn the clutch disk, the said slots being positioned in the one disk in such relation with the openings in the other disk that the defined operation results, the said pins and openings being of such relative size that there is interaction between them in moving the disks and the slots in the other disks being such that they allow some movement of the knob without turning said other disk, after which the disk is moved by the knob and a cam on the camera to be engaged by the knob after a given amount of rotation thereof to withdraw the pins from the openings permitting said pins to remain in the slots to bring about rotation of the shutter rewinding shaft on further rotation of the knob.

3. In combination with a reflecting camera including a reflecting mirror shaft and a shutter rewinding shaft and a diaphragm operating shaft, a finger knob, a tubular shaft rotatably and slidably mounted on the camera and having the knob rotatably and slidably mounted thereon, a pair of clutch discs one secured to said tubular shaft and the other secured to the mirror shaft, means connecting said clutch discs one to the shutter rewinding shaft and the other to the diaphragm operating shaft, one of said discs having openings and the other disc having slots, pins carried by the knob to enter the slots and openings, the said slots being such that the said pins can move therein without turning the disk, and the said openings being such that the said pins, when in said openings, will turn the clutch disk, the said slots being positioned in the one disk in such relation with the openings in the other disk that the defined operation results, the said pins and openings being of such relative size that there is interaction between them in moving the disks and the slots in the other disks being such that they allow some movement of the knob without turning said other disk, after which the disk is moved by the knob a cam on the camera to be engaged by the knob after a given amount of rotation thereof to withdraw the pins from the openings permitting said pins to remain in the slots to bring about rotation of the shutter rewinding shaft on further rotation of the knob, and a coil spring connected to the camera and to the knob and surrounding the tubular shaft and normally acting to disengage the pins from the openings and the slots and further acting to return the knob to its initial position after being rotated and manually freed.

4. In combination with a reflecting camera having a mirror operating shaft and a shutter rewinding shaft and a diaphragm operating shaft, a finger knob, a tubular shaft piloted on the mirror shaft and rotatably supported by the camera and having the knob rotatably and slidably mounted thereon, a clutch disc having openings secured on the mirror shaft and geared to the diaphragm operating shaft, a second clutch disc secured to the tubular shaft and geared to the shutter rewinding shaft and having slots, pins secured to the knob and adapted to be manually inserted through the slots of the second named disc into the openings of the first named disc, the said slots being such that the said pins can move therein without turning the disk, and the said openings being such that the said pins, when in said openings, will turn the clutch disk, the said slots being positioned in the one disk in such relation with the openings in the other disk that the defined operation results, the said pins and openings being of such relative size that there is interaction between them in moving the disks and the slots in the other disks being such that they allow some movement of the knob without turning said other disk, after which the disk is moved by the knob a cam on the camera to be engaged by the knob after a predetermined rotation thereof to disengage the pins from the openings of the first named disc to permit operation of the shutter rewinding shaft by the knob after rotation of the mirror shaft by said knob, and a spring acting on the knob to normally disengage the pins from the slots and openings and acting to return the knob to its initial position after being manually rotated and freed.

5. In combination with a reflecting camera including a reflecting mirror shaft and shutter rewinding shaft and diaphragm operating shaft, an operating knob, a tubular shaft mounted on the camera and having a finger knob movably mounted thereon, a pair of clutch disks, one secured to said tubular shaft and the other secured to the mirror shaft, means connecting one of said clutch disks to the shutter rewinding shaft and the other of said disks to the diaphragm operating shaft, one of said disks having openings and the other disk having slots and pins carried by the knob to enter the slots and openings, the said pins and openings being of such relative size that there is interaction between them in moving the disk, the said slots of the said second disk being such that they allow movement of the knob without turning the first disk, after which the said disk is moved by the knob.

6. In combination with a reflecting camera including a reflecting mirror shaft and shutter rewinding shaft and diaphragm operating shaft, an operating knob, a tubular shaft mounted on the camera and having a finger knob movably mounted thereon, a pair of clutch disks, one secured to said tubular shaft and the other secured to the mirror shaft, means connected one of said clutch disks to the shutter rewinding shaft and the other of said disks to the diaphragm operating shaft, one of said disks having openings and the other disk having slots and pins carried by the knob to enter the slots and openings, the said slots being such that the pins can move therein without turning the disk, and the openings being such that the pins, when in the openings, will turn the clutch disk, and the slots being positioned in the one disk in such relation with the openings in the other disk that the defined function is carried out.

WILLIAM S. KALS.